United States Patent
Benosman et al.

(10) Patent No.: US 8,855,826 B2
(45) Date of Patent: Oct. 7, 2014

(54) CONTROLLER FOR REDUCING VIBRATIONS IN MECHANICAL SYSTEMS

(75) Inventors: Mouhacine Benosman, Boston, MA (US); Vijay Shilpiekandula, Belmont, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 831 days.

(21) Appl. No.: 13/093,003

(22) Filed: Apr. 25, 2011

(65) Prior Publication Data

US 2012/0271464 A1    Oct. 25, 2012

(51) Int. Cl.
| | | |
|---|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |
| F16F 7/10 | (2006.01) |
| F16M 1/00 | (2006.01) |
| F16M 13/00 | (2006.01) |
| H02P 7/00 | (2006.01) |
| G05D 19/02 | (2006.01) |

(52) U.S. Cl.
CPC ..................................... G05D 19/02 (2013.01)
USPC ........... 700/280; 188/378; 248/638; 248/562; 318/432; 318/434; 318/461

(58) Field of Classification Search
CPC ............ G05D 19/02; F16F 15/02; F16F 7/10;
F16F 7/1005; F16F 15/08; F16F 7/00; G10K 11/1786; B23Q 5/00; B23Q 5/20; B23Q 2705/005; B60N 2/502; B60N 2/505
USPC .................. 700/280; 188/378; 248/638, 562; 318/432, 434, 461
See application file for complete search history.

(56) References Cited

U.S. PATENT DOCUMENTS

| | | | | |
|---|---|---|---|---|
| 5,993,338 | A | * | 11/1999 | Kato et al. ....................... 474/12 |
| 6,161,419 | A | * | 12/2000 | Langlechner ................. 73/11.08 |
| 7,275,627 | B1 | | 10/2007 | Mayama |
| 7,375,916 | B2 | * | 5/2008 | Semba et al. .............. 360/77.04 |
| 7,532,951 | B2 | | 5/2009 | Sato |
| 7,686,144 | B2 | * | 3/2010 | Shibayama et al. ........... 188/378 |
| 8,686,740 | B2 | * | 4/2014 | Morishima .................... 324/601 |
| 2002/0104950 | A1 | * | 8/2002 | Mayama ........................ 248/638 |
| 2004/0135536 | A1 | * | 7/2004 | Iwashita et al. ............... 318/652 |
| 2005/0082994 | A1 | * | 4/2005 | Qiu et al. ....................... 318/128 |
| 2007/0028885 | A1 | * | 2/2007 | Stothers et al. ............ 123/192.1 |
| 2007/0061047 | A1 | | 3/2007 | Sato |
| 2009/0097830 | A1 | * | 4/2009 | Iwashita et al. ............... 388/800 |
| 2009/0133546 | A1 | * | 5/2009 | Araie et al. ...................... 82/146 |
| 2010/0108027 | A1 | * | 5/2010 | Nakamura et al. ............ 123/322 |
| 2011/0167025 | A1 | * | 7/2011 | Danai et al. ..................... 706/12 |

* cited by examiner

*Primary Examiner* — Kavita Padmanabhan
*Assistant Examiner* — Jason Lin
(74) *Attorney, Agent, or Firm* — Dirk Brinkman; Gene Vinokur

(57) ABSTRACT

Vibration in a mechanical system driven by a motor connected to a load is reduced by providing an angular position and an angular velocity of the motor to a linear feedback term and to a nonlinear feedback term. Outputs of the linear feedback term and the nonlinear feed term, and an optimal feedforward term determined off-line are summed to produce a summed signal, which is fed back to control a torque of the motor.

9 Claims, 5 Drawing Sheets

100

CONTROLLER FOR REDUCING VIBRATIONS IN MECHANICAL SYSTEMS

FIELD OF THE INVENTION

This invention relates generally to controlling mechanical systems and more particularly to reducing vibrations in mechanical systems driven by a rotating motor.

BACKGROUND OF THE INVENTION

To increase precision in mechanical systems, such as automated factory systems and machine tools, vibration isolation and suppression is required to maximize performance. With a machine tool, in particular, it is required to minimize vibrations that affect a base that support the tool.

If the tool mounted on the base produces structural resonance vibrations, by external disturbances from the environment or from servo-motor torques that drive the tool, and a sufficient damping is not ensured, then the resonance vibrations must minimized to maximize the performance, e.g., a low settling time, and a high tracking bandwidth.

Therefore, it is desired to position a load with precision and settling time, minimize the base vibrations, and minimize the effect of external disturbances on the load positioning and the base vibration.

Typically, conventional solutions rely on direct measurement or estimation of the base vibration amplitude and frequency, e.g., U.S. Patent Publications 20070061047, U.S. Pat. Nos. 7,532,951, and 7,275,627. Those solutions have the drawback of being subject to the well known problem of frequency spill-over, which is the destabilizing effect of unmodeled frequencies. Furthermore, those solutions may require sensors to detect and measure the base vibration, which can increases the fabrication and maintenance costs.

SUMMARY OF THE INVENTION

The embodiments of the invention can used to control mechanical systems, such as a machine tool. The tool includes a servo-motor that drives a load via a linear ball-screw transmission. Typically the tool is arranged on a flexible base, which is fixed to the ground. The motor includes an position angular sensor.

The controller controls the servo motor that drives the load to a position within a desired precision, and settling time. The controller also minimizes the base vibration induced by motion of the load, and minimizes the effect of external disturbances on the system.

The controller includes an optimal feedforward module designed according to a model of the system, a linear feedback module, and a nonlinear feedback module. The feedback modules use measurements of the angular position and the angular velocity.

The controller applies a sum of the outputs of the modules to control the torque of the servo-motor such that vibrations are reduced.

DETAILED DESCRIPTION OF THE PREFERRED EMBODIMENTS

Figure 1:
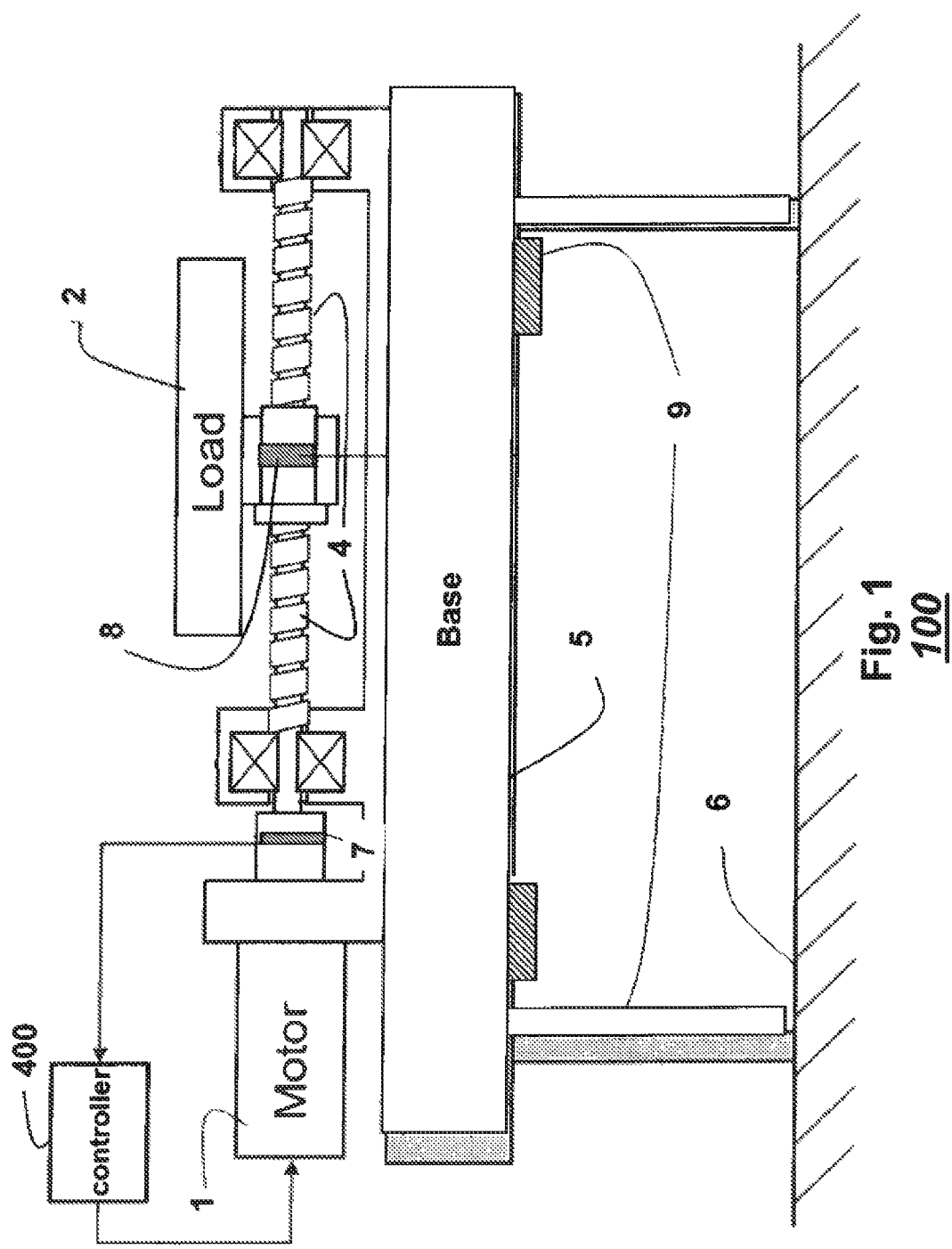
FIG. 1 is a schematic of a system controlled to reduce vibrations according to embodiments of the invention.

FIG. 1 shows a mechanical system 100 in which a controller 400 designed according to embodiments to the invention reduces vibrations. The system includes a servo-motor mounted 1 and a ball-screw 4 arranged on a base 5. The servo-motor is connected to a load 2, e.g., via the ball-screw. The base is rigidly mounted to the ground 6. An angular sensor 7 is mounted on the motor to measure an angular position of the motor in real-time. The angular position is used for feedback control.

A linear sensor 8 is mounted on the load to measure its position relative to the base in real time. The measurement of the position is not used for feedback control, it is only used for performance evaluation.

One or more vibration sensor 9 are mounted on the base to measure an amplitude of the vibrations. The measurement is not used for feedback control, it is only used for performance evaluation.

Figure 2:
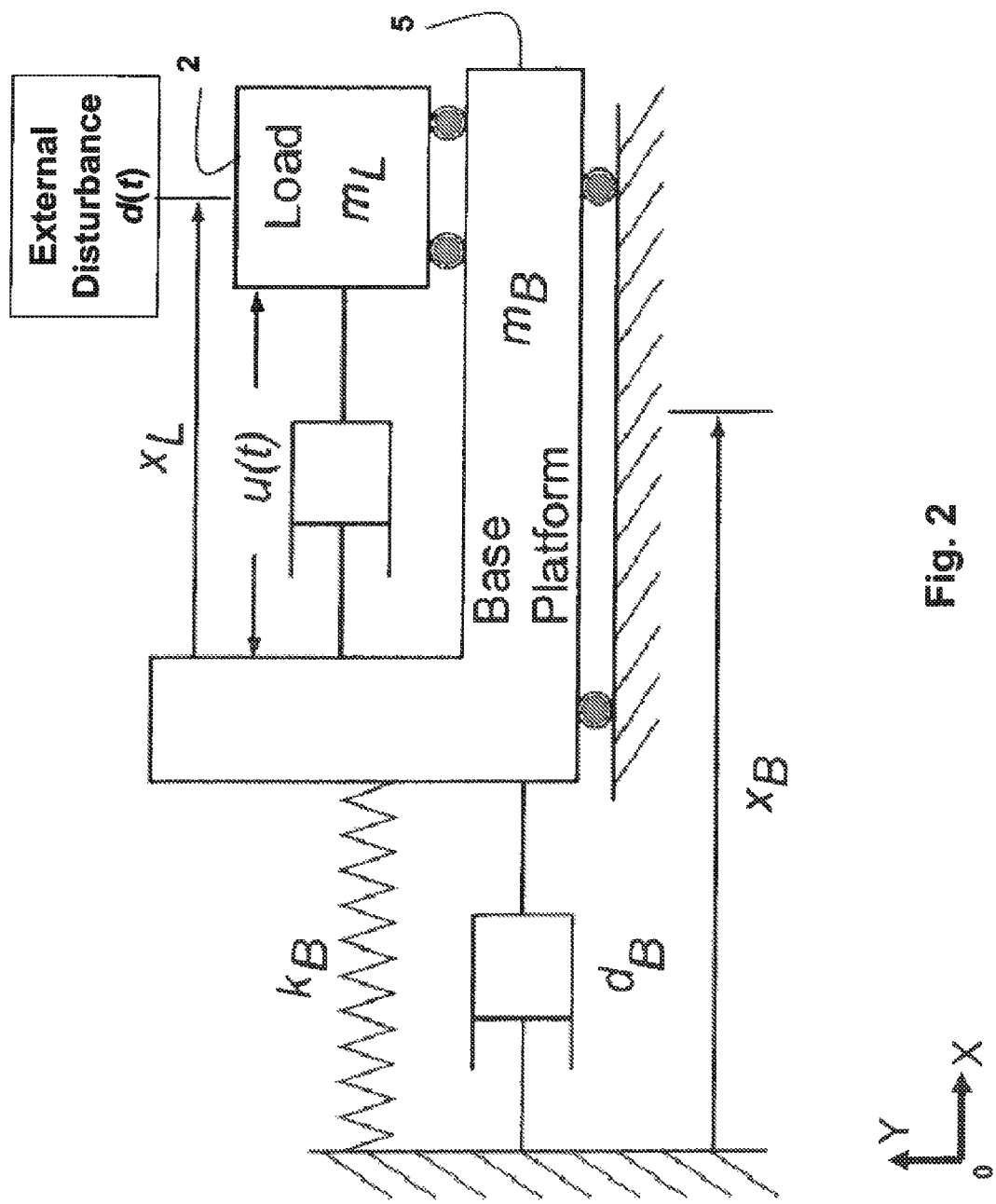
FIG. 2 is a schematic of a two mass-lumped model according to embodiments of the invention.

FIG. 2 show a 2-mass lumped parameters model of the system. The load is represented by a mass $m_L$ with a linear damping coefficient $d_M$. The base is represented by a mass $m_B$ with linear damping and spring coefficients $d_B$ and $k_B$ respectively. The linear motion of the load with respect to the base is $x_L$. The linear motion of the base with respect to an inertial base (o, X, Y) is $x_B$. External disturbances due to the environment and acting on the load motion are represented by the a time function d(t) and u represents the control force acting on the load.

Using Newton law, the model of the system as shown in on FIG. 2 is given by the following differential Eqns.

$$\begin{Bmatrix} \dot{x}_L \\ \ddot{x}_L \\ \dot{x}_B \\ \ddot{x}_B \end{Bmatrix} = \begin{bmatrix} 0 & 1 & 0 & 0 \\ 0 & -d_L\left(\frac{1}{m_L}+\frac{1}{m_B}\right) & \frac{k_B}{m_B} & \frac{d_B}{m_B} \\ 0 & 0 & 0 & 1 \\ 0 & \frac{d_L}{m_B} & -\frac{k_B}{m_B} & -\frac{d_B}{m_B} \end{bmatrix} \quad (1)$$

$$\begin{Bmatrix} x_L \\ \dot{x}_L \\ x_B \\ \dot{x}_B \end{Bmatrix} + \begin{bmatrix} 0 \\ \left(\frac{1}{m_L}+\frac{1}{m_B}\right) \\ 0 \\ -\frac{1}{m_B} \end{bmatrix} u + \begin{bmatrix} 0 \\ d(t) \\ 0 \\ 0 \end{bmatrix},$$

where $\dot{x}$ and $\ddot{x}$ are the first and second derivative of x with respect to time t.

The controller is designed according to $$u(t) = m_L \ddot{x}_{load-p}(t) + d_L \dot{x}_{load-p}(t) + k_p(x_{load-p}(t) - x_L(t)) - \quad (2)$$

$$\text{sign}(-m_L(\dot{x}_{load-p}(t) - \dot{x}_L(t)))(\text{d\_max} + eps),$$

$$-x_L(t)) + k_v(\dot{x}_{load-p}(t) - \dot{x}_L(t)) -$$

$$\text{sign}(-m_L(\dot{x}_{load-p}(t) - \dot{x}_L(t)))(\text{d\_max} + eps),$$

where $x_{load\_p}(t)$ is the desired trajectory of the load time-motion planned off-line such that $x_{load\_p}(t)$ relates the desired motion initial point $(t_0, x_{L\text{-}initial})$, and the desired final motion point $(t_f, x_{L\text{-}final})$ cancels the transient solution of the internal dynamics given by $$(m_B+m_L)\ddot{x}_B(t)+d_B\dot{x}_B(t)+k_Bx_B(t)=-m_L\ddot{x}_{load\_p}(t), \quad (3)$$

where sign (x)=1 if x>0, sign(x)=−1 if x<0 and k_p, k_v are the linear quadratic regulator (LQR) gains determined to stabilize the dynamics $$m_L(\ddot{x}_{load\_P}(t)-\ddot{x}_L(t))+d_L(\dot{x}_{load\_P}(t)-\dot{x}_L(t))+v(k_p,k_v)=0. \quad (4)$$

Using the virtual input $$v(k_p,k_v)=k_p(x_{load\_p}(t)-x_L(t))+k_v(\dot{x}_{load\_p}(t)-\dot{x}_L(t)), \quad (5)$$

where the constants d_max and eps are predetermined, and defined in greater detail below.

The controller according to Eqn. 2 has three main terms: a feedforward term $$u1(t)=m_L\ddot{x}_{load\_p}(t)+d_L\dot{x}_{load\_p}(t)$$

based on a planned load trajectory $x_{load\_p}(t)$ a linear collocated feedback term $$u2(t)=k_p(x_{load\_p}(t)-x_L(t))+k_v(\dot{x}_{load\_p}(t)-\dot{x}_L(t))$$

based on the linear-quadratic-regulator (LQR) method; and a nonlinear collocated feedback term $$u3(t)=-\text{sign}(-m_L(\dot{x}_{load\_p}(t)-\dot{x}_L(t)))(d\_max+eps),$$

based on a disturbance rejection method, e.g. a Lyapunov reconstruction technique.

The sign function can be replaced by the following saturation function (sat)

$$sat(x) = \begin{cases} x/\text{eps\_tilde}, & |x| \leq \text{eps\_tilde} \\ \text{sign}(x), & |x| > \text{eps\_tilde}, \end{cases} \quad (6)$$

where eps_tilde is predetermined, and defined below.
Note that the position and the velocity of the load are not directly measured; they are computed from the angular position and velocity of the motor, using a simple gain equation obtained from the geometrical characteristics, i.e. radius, of the ball-screw system.

The main idea behind our controller is that the base natural frequencies are not excited due to the proper off-line planning of the desired load time motion, and the base vibration is decoupled from the load acceleration by the disturbance rejection nonlinear term. This implies that transmission of the vibration from the base to the load and back from the load to the base is rejected, and thus the base vibrations are natural damped.

To describe the best mode of the invention, an example embodiment of the computation of the feedforward term u1(t) is described below.

We select a desired load time-trajectory of a polynomial form:

$$x_{load\_p}(t) = \sum_{i=0}^{i=9} a_i t^i,$$

where $a_i$ are coefficients solved as described below.

Then in closed form, we solve the linear differential Eqn. 3. The solution is $$x_B(t)=A(a_i)e^{r1t}+B(a_i)e^{r2t}+\tilde{x}_B(a_i,t),$$

where A and B are linear functions of the coefficients $a_i$ obtained by solving the linear differential Eqn. 3 and factorizing the terms $e^{r1t}$ and $e^{r2t}$, r1, r2 are the roots of the characteristic associated with the differential Eqn. 3 without the right-hand side, and $\tilde{x}_B(a_i,t)$ is the non-homogeneous solution of Eqn, 3, which is function of the coefficients $a_i$.

We determine the coefficients $a_i$ by solving the algebraic constraints $x_{load\_p}(t_O)$=xl_initial, $x_{load\_p}(t_f)$=xl_final, $\dot{x}_{load\_p}(t_0)$=0

$\dot{x}_{load\_p}(t_f)$=0, $\ddot{x}_{load\_p}(t_0)$=0, $\ddot{x}_{load\_p}(t_f)$=0, $x_B(t_0)$=$\tilde{x}_B(t_0)$, $$\dot{x}_B(t_0)=\dot{\tilde{x}}_B(t_0), x_B(t_f)=0, \dot{x}_B(t_f)=0. \quad (7)$$

We determine a closed-from feedforward term $$u1(t)=m_L\ddot{x}_{load\_p}(t)+d_L\dot{x}_{load\_p}(t)$$

Figure 3:
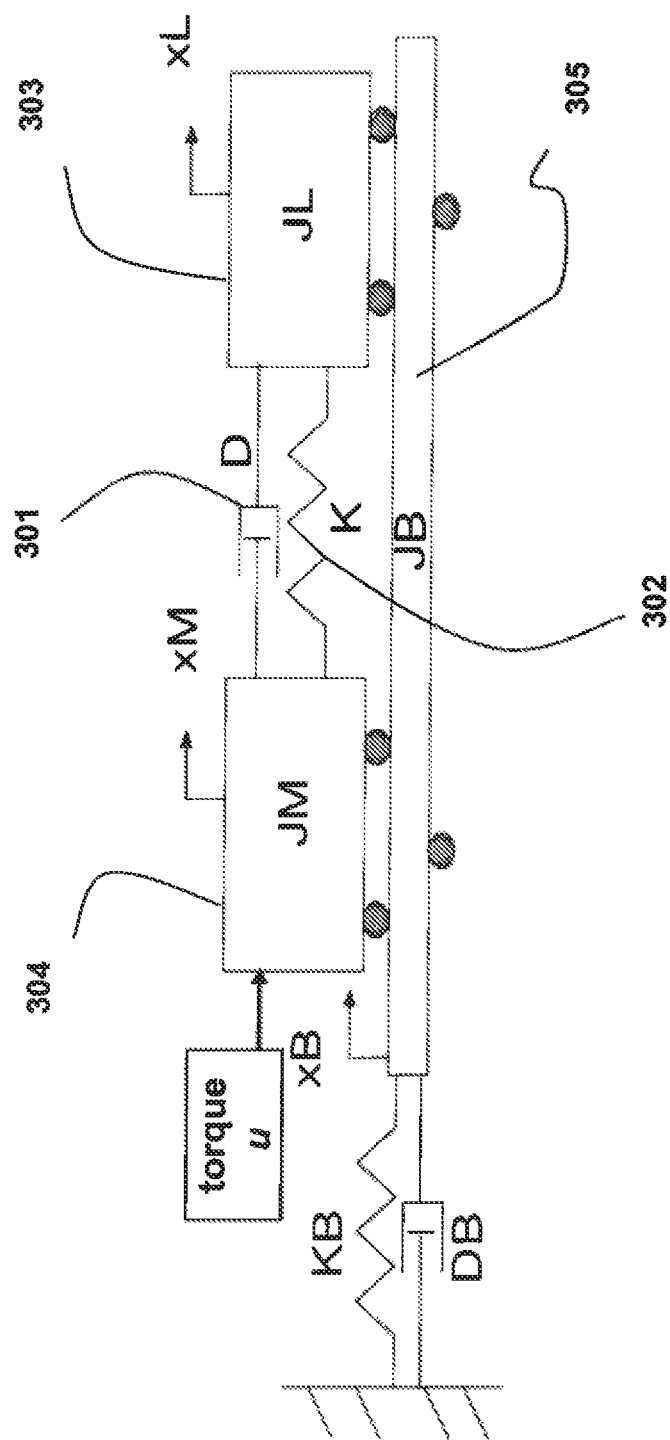
FIG. 3 is a schematic view of the three mass-lumped model according to embodiments of the invention.

To test the operation of the above controller, a more realistic model of the system 100 is described. This model shown in FIG. 3, is a 3 mass lumped-parameters model $$J_M\ddot{x}_M+D(\dot{x}_M-\dot{x}_L)+K(x_M-x_L)=u-J_M\ddot{x}_B$$

$$J_L\ddot{x}_L+D(\dot{x}_L-\dot{x}_M)+K(x_L-x_M)=-J_L\ddot{x}_B$$

$$J_B\ddot{x}+D_B\dot{x}_B+K_Bx_B=-u$$

$$y=x_M \quad (8)$$

The main difference with respect to the 2-mass model given by Eqn. 1, is the introduction of a linear damping D 301 and a linear spring K 302 to model the flexibility of the transmission between the motor and the load. In this case, there can be a difference between the position of the load $x_L$, and the position of the motor $x_M$. In FIG. 3 and Eqn. 8, the load is represented by its inertia $J_L$ 303, the motor is represented with its inertia $J_M$ 304, and the base is represented with its inertia $J_B$ 305 The motor is controlled by its torque u, and $K_B$, and $D_B$ represent the linear spring coefficient and the linear damping coefficient of the base, respectively.

Figure 4:
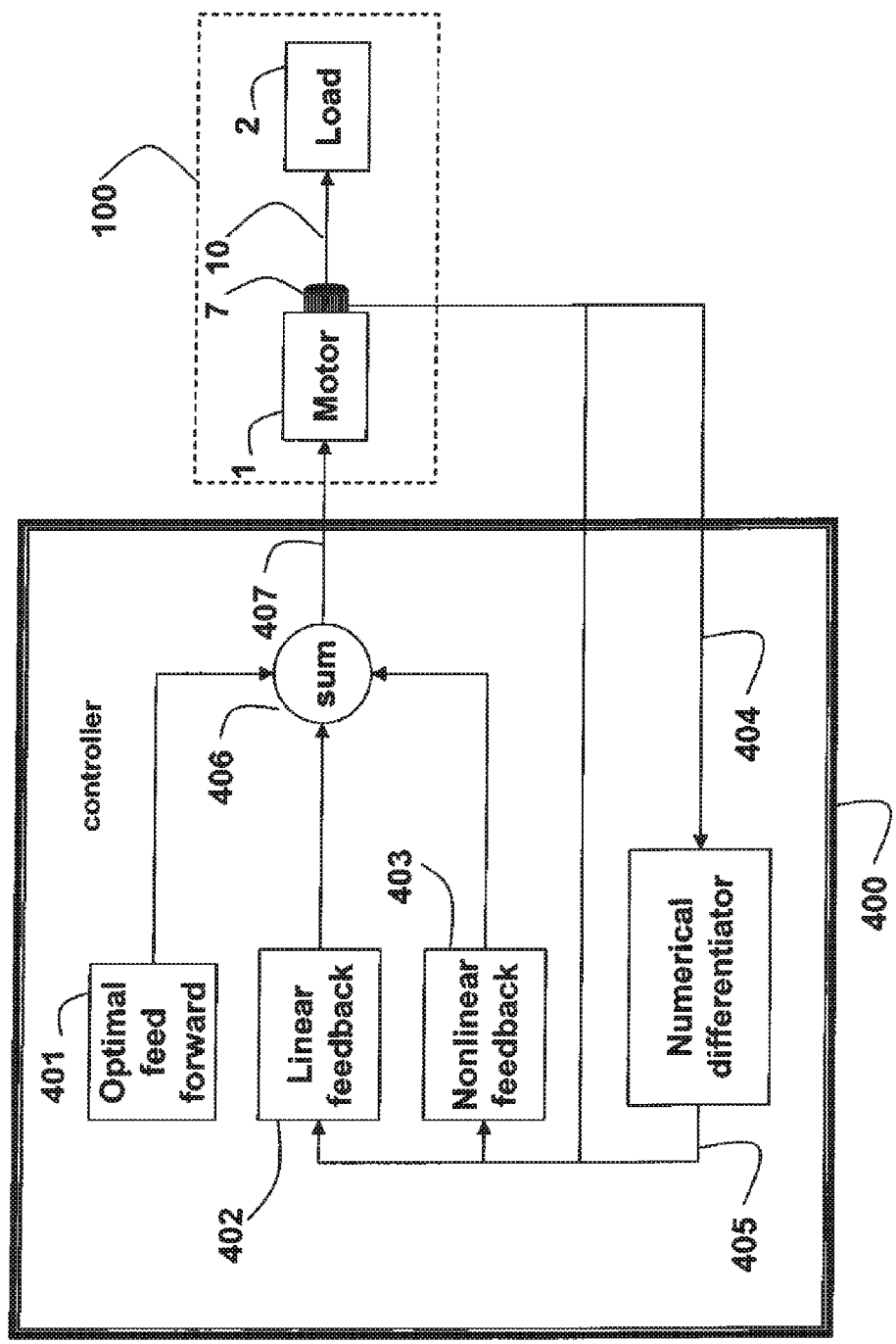
FIG. 4 is a schematic of a controller according to embodiments of the invention.

FIG. 4 is block diagram of the mechanical system 100, the controller 400 and according to Eqn. 2. The controller includes an optimal feedforward module 401, a collocated linear feedback module 402, and the collocated nonlinear feedback module 403.

The angular sensor 7 provides the angular position 10 of the motor 1. The angular position is used for the feedback control. The angular position is fed to a numerical differentiation 404 to measure the motor angular velocity 405, i.e., the first derivative of the angular position.

Outputs of the modules 401-403 are summed 406, and the sum 407 is used to control the angular velocity of the motor during operation so that vibration is reduced.

Figure 5:
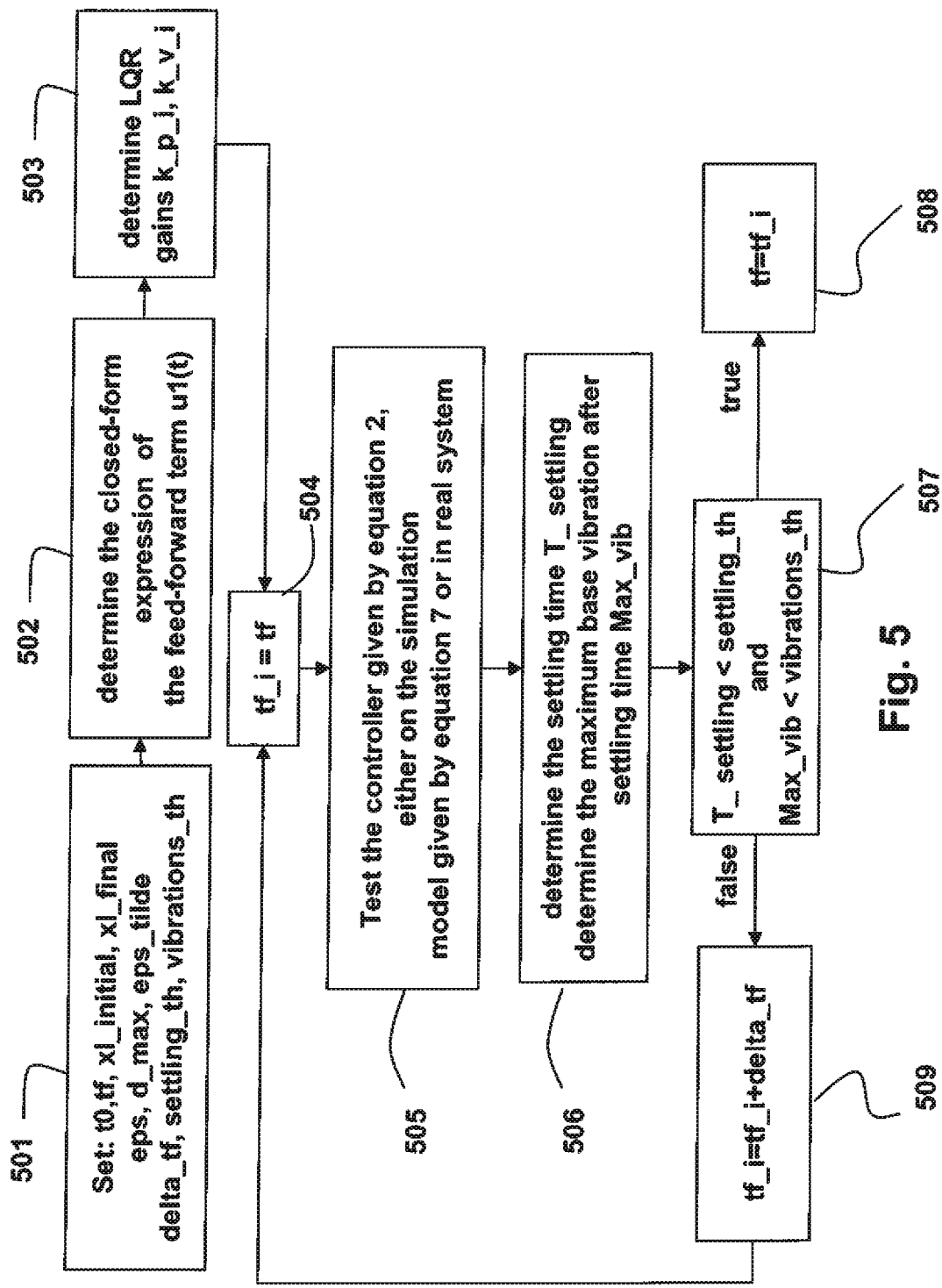
FIG. 5 is flow chart of a process for tuning controller parameters according to embodiments of the invention.

FIG. 5 summarizes the process for tuning parameters of the controller.

Step 501 initializes various variables:
t0=initial motion point
tf=final motion point
xl_initial=linear motion
xl_final=final linear motion
eps=a small positive value less than 1
d_max=maximum value of the expected disturbances
eps_tilde=a small positive value less than 1
delta_tf=incremental step of load motiont
settling_th=settling threshold
vibrations_th=vibration threshold.

Step 502 determines determine the closed-form expression of the feed-forward term u1(t)

Step 503 determines the LQR gains k_p_i, k_v_i, defined as the proportional and the derivative gain obtained by the LQR algorithm.

Step 504 sets tf_i=tf.

Step 505 test the controller according Eqn. 2 either on the simulation model given by Eqn. 8, or in the system 100.

Step 506 determines a settling time T_settling, which is defined as the first instant after which the load position remains within a desired interval around a desired final load position. The interval can be predefined, e.g., by a user of the system. Step 506 also determines Max_vib, which is the maximum base vibration amplitude after the settling time.

Step 507 tests if T_settling<settling_th, and Max_vib<vibrations_th.

If true, then step 508 sets tf=tf_i.

Otherwise, if false, step 509 set s tf_i=tf_i+delta_tf, and repeats beginning at step 504.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for reducing vibration and positioning a load in a mechanical system driven by a motor connected to the load, comprising:
    an optimal feedforward module designed according to a model of the system;
    a linear feedback module; and
    a nonlinear feedback module, wherein inputs to the linear feedback module and the nonlinear feedback module are an angular position and an angular velocity of the motor, and outputs of the optimal feedforward module, the linear feedback module, and the nonlinear feedback module are summed and fed back to control a torque of the motor, wherein the model is a 3-mass lumped parameters model, wherein the load is represented by a mass $m_L$ with a linear damping coefficient $d_M$, the base is represented by a mass $m_B$ with linear damping and spring coefficients $d_B$ and $k_B$ respectively, a linear motion of the load with respect to the base is $x_L$, a linear motion of the base with respect to an inertial base is $x_B$, and external disturbances due to an environment and acting on the load are represented by the a time function d(i), and the model is given by a differential equation $$J_M \ddot{x}_M + D(\dot{x}_M - \dot{x}_L) + K(x_M - x_L) = u - J_M \ddot{x}_B$$

$$J_L \ddot{x}_L + D(\dot{x}_L - \dot{x}_M) + K(x_L - x_M) = -J_L \ddot{x}_B$$

$$J_B \ddot{x}_B + D_B \dot{x}_B + K_B x_B = -u$$

$$y = x_M$$

where $\dot{x}$ and $\ddot{x}$ are the first and second derivative of x with respect to time t, and wherein the position of the motor is $x_M$, the load is represented by an inertia $J_L$, the motor is represented with an inertia $J_M$, the base is represented with an inertia $J_B$, and the motor is controlled by a torque u, and $K_B$, and $D_B$ represent linear spring coefficient and the linear damping coefficient of the base, respectively.

2. The controller of claim 1, wherein the motor is connected to the load via a ball-screw.

3. The controller of claim 1, wherein the system is modeled by a 2-mass lumped parameters model, wherein the load is represented by a mass $m_L$ with a linear damping coefficient $d_M$, a base is represented by a mass $m_B$ with linear damping and spring coefficients $d_B$ and $k_B$ respectively, a linear motion of the load with respect to the base is $x_L$, a linear motion of the base with respect to an inertial base is $x_B$, and external disturbances due to an environment and acting on the load are represented by the a time function d(t), and the model is given by a differential equation $$\begin{Bmatrix} \dot{x}_L \\ \ddot{x}_L \\ \dot{x}_B \\ \ddot{x}_B \end{Bmatrix} = \begin{bmatrix} 0 & 1 & 0 & 0 \\ 0 & -d_L\left(\frac{1}{m_L}+\frac{1}{m_B}\right) & \frac{k_B}{m_B} & \frac{d_B}{m_B} \\ 0 & 0 & 0 & 1 \\ 0 & \frac{d_L}{m_B} & -\frac{k_B}{m_B} & -\frac{d_B}{m_B} \end{bmatrix} \quad (1)$$

$$\begin{Bmatrix} x_L \\ \dot{x}_L \\ x_B \\ \dot{x}_B \end{Bmatrix} + \begin{bmatrix} 0 \\ \left(\frac{1}{m_L}+\frac{1}{m_B}\right) \\ 0 \\ -\frac{1}{m_B} \end{bmatrix} u + \begin{bmatrix} 0 \\ d(t) \\ 0 \\ 0 \end{bmatrix},$$

where $\dot{x}$ and $\ddot{x}$ are the first and second derivative of x with respect to time, T, and wherein u represents the control force acting on the load.

4. The controller of claim 1, wherein a settling time of a final motion point of a linear motion of the load is tuned according to the differential equation modeling the 3-mass lumped model.

5. The controller of claim 1, wherein a desired motion of the load is controlled by the optimal feedforward module determined off-line, and by a linear collocated feedback module based on the angular position and an angular velocity of the motor in real time.

6. The controller of claim 1 or 3, wherein an effect by the external disturbances d(t) on the mechanical system is rejected a nonlinear collocated feedback term.

7. The controller of claim 1, wherein the angular velocity is determined by numerical differentiation of the angular position.

8. The controller of claim 1, the system is mounted on a base, and natural frequencies of the base are not excited due to optimal feedforward module, the natural frequencies of the base are decoupled from the load acceleration by the feedback module.

9. A method for reducing vibration and positioning a load in a mechanical system driven by a motor connected to the load, comprising the steps of:
    providing an angular position and an angular velocity of the motor to a linear feedback term and to a nonlinear feedback term;

summing outputs of the linear feedback term and the nonlinear feed term, and an optimal feedforward term determined off-line to produce a summed signal; and feeding back the summed signal to control a torque of the motor, wherein the system modeled by a 3-mass lumped parameters model, wherein the load is represented by a mass $m_L$ with a linear damping coefficient $d_M$, the base is represented by a mass $m_B$ with linear damping and spring coefficients $d_B$ and $k_B$ respectively, a linear motion of the load with respect to the base is $x_L$, a linear motion of the base with respect to an inertial base is $x_B$, and external disturbances due to an environment and acting on the load are represented by the a time function $d(t)$, and the model is given by a differential equation $$J_M \ddot{x}_M + D(\dot{x}_M - \dot{x}_L) + K(x_M - x_L) = u - J_M \ddot{x}_B$$

$$J_L \ddot{x}_L + D(\dot{x}_L - \dot{x}_M) + K(x_L - x_M) = -J_L \ddot{x}_B$$

$$J_B \ddot{x}_B + D_B \dot{x}_B + K_B x_B = -u$$

$$y = x_M$$

where $\dot{x}$ and $\ddot{x}$ are the first and second derivative of x with respect to time t, and wherein the position of the motor is $x_M$, the load is represented by an inertia $J_L$, the motor is represented with an inertia $J_M$, the base is represented with an inertia $J_B$, and the motor is controlled by a torque u, and $K_B$, and $D_B$ represent linear spring coefficient and the linear damping coefficient of the base, respectively, wherein the steps are performed in a controller connected to the motor.

\* \* \* \* \*